(12) United States Patent  
Gupta et al.

(10) Patent No.: US 7,387,389 B2
(45) Date of Patent: Jun. 17, 2008

(54) IMAGE DISPLAY SYSTEM AND METHOD

(75) Inventors: Anurag Gupta, Corvallis, OR (US);
David L. Erickson, Corvallis, OR (US);
Scott A Lerner, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 11/331,620

(22) Filed: Jan. 13, 2006

(65) Prior Publication Data
US 2007/0165187 A1 Jul. 19, 2007

(51) Int. Cl.
G03B 21/26 (2006.01)
G03B 21/20 (2006.01)
H04N 7/01 (2006.01)
H04N 11/20 (2006.01)
H04N 5/46 (2006.01)
H04N 5/74 (2006.01)
H04N 5/70 (2006.01)
G02F 1/1335 (2006.01)
G03H 1/00 (2006.01)
G02B 26/08 (2006.01)
G02B 13/08 (2006.01)
F21V 7/04 (2006.01)

(52) U.S. Cl. .............. 353/30; 353/38; 353/84; 353/102; 348/445; 348/750; 348/758; 348/759; 348/801; 348/E5.111; 349/7; 359/34; 359/207; 359/623; 359/668; 385/34; 385/133; 362/556; 362/561; 362/346

(58) Field of Classification Search .......... 353/30, 353/37, 38, 84, 98, 99, 102; 348/445, 556, 348/E5.111, E11.013, 739, 744, 750, 758, 348/759, 801, 913; 349/7; 359/34, 207, 359/668, 618–623; 385/34, 133; 362/551, 362/555, 561, 341, 346

See application file for complete search history.

(56) References Cited

U.S. PATENT DOCUMENTS

| 5,748,376 | A  | 5/1998  | Lin et al. |
| 5,902,033 | A  | 5/1999  | Levis et al. |
| 5,980,046 | A  | 11/1999 | Park |
| 6,224,216 | B1 | 5/2001  | Parker et al. |
| 6,317,171 | B1 | 11/2001 | Dewald |
| 6,322,219 | B1 | 11/2001 | Okamori et al. |
| 6,398,368 | B2 | 6/2002  | Chen |
| 6,491,396 | B2 | 12/2002 | Karasawa et al. |

(Continued)

FOREIGN PATENT DOCUMENTS

JP         08163477 A   *   6/1996

Primary Examiner—Rochelle-Ann Blackman

(57) ABSTRACT

An image display device includes an image processing unit, a light source assembly, an optical modulator assembly, and a projection lens assembly. The image processing unit is configured to receive a video signal and generate image data and control signals. The light source assembly and optical modulator assembly are each controlled by the control signals such that the light source assembly generates illumination in a spatial distribution pattern that is coupled to optical modular assembly via a homogenizing device. The projection lens assembly is configured to project an image from the optical modulator assembly onto a viewing surface. The optical modular assembly is configured to maximize the amount of illumination coupled from the light source assembly, and includes at least one optical modulator surface configured to have a substantially 1:1 aspect ratio.

15 Claims, 3 Drawing Sheets

U.S. PATENT DOCUMENTS

| | | |
|---|---|---|
| 6,517,210 B2 | 2/2003 | Peterson et al. |
| 6,739,723 B1 | 5/2004 | Haven et al. |
| 6,860,606 B2 | 3/2005 | Childers et al. |
| 6,886,944 B2 | 5/2005 | Dahlgren |
| 6,963,319 B2 | 11/2005 | Pate et al. |
| 2002/0140911 A1 | 10/2002 | Peterson |
| 2004/0156212 A1 | 8/2004 | Kamijima |
| 2004/0160758 A1 | 8/2004 | Chang et al. |
| 2004/0179030 A1 | 9/2004 | Cole et al. |
| 2005/0030482 A1 | 2/2005 | Childers et al. |
| 2005/0078056 A1 | 4/2005 | Childers |
| 2005/0128605 A1 | 6/2005 | Cole et al. |
| 2005/0248736 A1* | 11/2005 | Itoh .................... 353/102 |
| 2006/0044795 A1* | 3/2006 | Tatsuno ................. 362/231 |

* cited by examiner

IMAGE DISPLAY SYSTEM AND METHOD

BACKGROUND OF THE INVENTION

Various techniques for displaying images exist. A typical digital projector has the following parts in order: Illumination system, optical modulator assembly and a projection lens system. A light source assembly is used by the illumination system to illuminate the optical modulator assembly and the projection lens system images the effective optical modulator surface on a screen.

The illumination system typically consists of a light source assembly, color wheel, IR/UV filters, light source homogenizer, and an illumination relay made up of lenses/mirrors. An optical modulator assembly can consist of one or more optical modulators such as (DMD, LCos, LCD etc.). When certain optical modulator assemblies and the light source assemblies are used, a color wheel and IR/UV filters can be omitted depending upon the design architecture. A projection lens system typically consists of lenses and mirrors.

A light source assembly typically consists of one or more light sources, such as LEDs, lasers, incandescent arc lamps, such as Hg, Xe or metal halide.

In a typical system, significant light is lost in the coupling within the illumination system with regard to the light source assembly. One of the reasons for this loss is geometric shape mismatch between the spatial distribution pattern of the light source and the collection of light by the illumination relay. Hence, system efficiency is significantly reduced.

SUMMARY OF THE INVENTION

One aspect of the present invention provides an image display device. The device includes an image processing unit, a light source assembly, an optical modulator assembly, and a projection lens assembly. The image processing unit is configured to receive a video signal and generate image data and control signals. The light source assembly and optical modulator assembly are each controlled by the control signals such that the light source assembly generates illumination in a spatial distribution pattern that is coupled to optical modular assembly via a homogenizing device. The projection lens assembly is configured to project an image from the optical modulator assembly onto a viewing surface. The optical modular assembly is configured to maximize the amount of illumination coupled from the light source assembly, and includes at least one optical modulator surface configured to have a substantially 1:1 aspect ratio.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
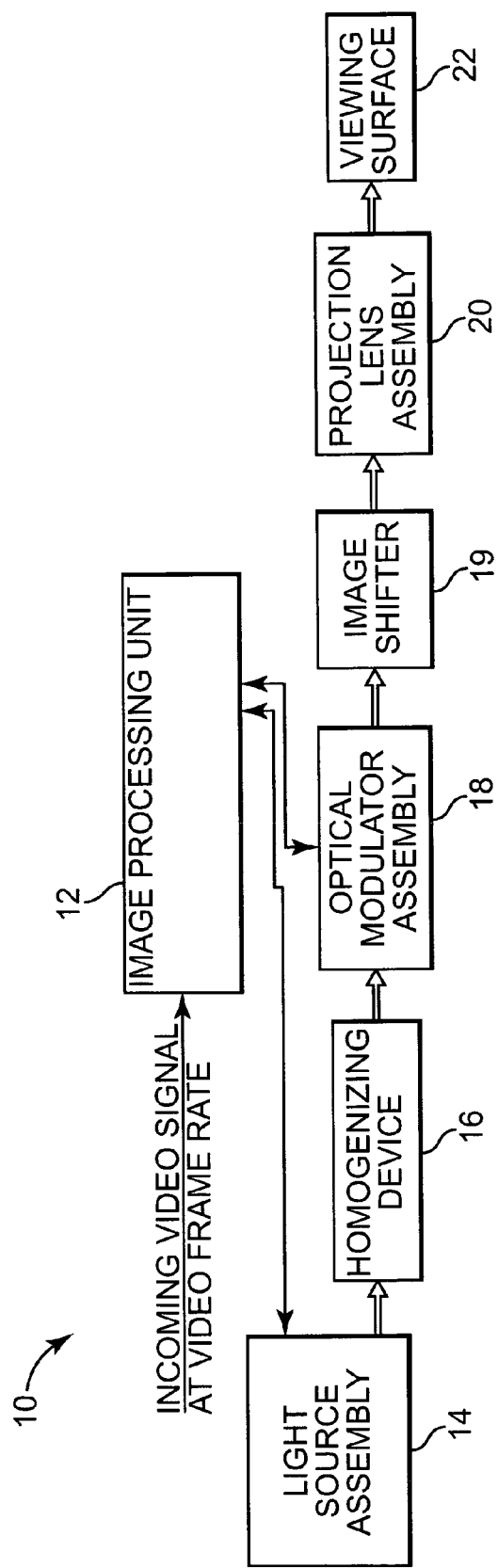
FIG. 1 is a block diagram illustrating one embodiment of an image display system.

FIG. 1 illustrates one embodiment of an image display system 10. In one example, image display system 10, includes image processing unit 12, light source assembly 14, homogenizing device 16, optical modulator assembly 18, a projection lens assembly 20 and viewing surface 22. In one example, image display system 10 is a digital projector that is used to project an image. Image processing unit 12 receives an incoming video signal. Image processing unit 12 processes the video signal and then controls light source assembly 14 and optical modulator assembly 18 in order to project the incoming video signal as an image on viewing surface 22. Projection lens assembly 20 is configured between optical modulator assembly 18 and viewing surface 22 in order to help project the image on viewing surface 22.

Image display system 10 facilitates processing of an image to create a displayed image on viewing surface 22. An image is defined to include any pictorial, graphical, and/or textural characters, symbols, illustrations, and/or other representation of information. An image typically includes individual picture elements or pixels.

In one embodiment, image processing unit 12 is configured to receive the incoming video signal and to generate image data indicative of the video signal. Image processing unit 12 is then further configured to generate control signals from the image data. These control signals are used to control light source assembly 14 and optical modulator assembly 18. In one embodiment, homogenizing device 16 and/or optical modulator assembly 18 is configured to maximize light-coupling efficiency between light source assembly 14 and optical modulator assembly 18.

In one embodiment, light source assembly 14 is part of an illumination system, which typically consists of the light source assembly, a color wheel, IR/UV filters, a light source homogenizer, and an illumination relay made up of lenses/mirrors. In one embodiment, light source assembly 14 includes one or more light sources, such as LEDs, lasers, incandescent arc lamps, such as Hg, Xe or metal halide.

For example, in one embodiment, light source assembly 14 includes a periodic sequential color source, such as a color wheel, modulating light from an arc lamp. In one case, the periodic color source generates a sequence of primary colored sub-frames. For example, a three-segment RGB (red, green, blue) color wheel generates one color sub-frame for each of red, green, and blue during one frame period (or in some cases two color sub-frames if rotated at double speed).

In another case, light source assembly 14 includes a plurality of solid state light emitting diodes (LEDs), for example, red LED(s), green LED(s), and blue LED(s). It can be appreciated that alternative and/or additional solid state light sources can be used generating colors such as white, cyan, yellow, magenta, among others. In such an embodiment, the color wheel and IR/UV filters can typically be omitted.

In any case, light source assembly 14 of the illumination system is optically configured to illuminate optical modulator assembly 18 and the projection lens assembly 20 images the effective optical modulator surface on a viewing surface 22. In one embodiment, homogenizing device 16 is configured homogenize the light from light source assembly 14 and then an illumination relay used the light from homogenizing device 16 to illuminate the optical modulator assembly 18. In one case homogenizing device 16 includes an integrating tunnel or similar light-coupling device. In other embodiments it is a rod, a fly's eye condenser lens system or the like.

In one embodiment, optical modulator assembly 18 includes one or more optical modulators with a modulator surface. In one embodiment, the optical modulator or modulators of the optical modulator assembly 18 is a digital micromirror device (DMD). A DMD has an array of micro-mechanical display elements, each having a tiny mirror that is individually addressable with an electronic signal. Depending on the state of its addressing signal, each mirror tilts so that it either does or does not couple light to an image plane of viewing surface 22. Each of the mirrors is referred to as a "pixel element," and the image each pixel element generates upon the viewing surface 22 can be referred to as a "pixel." Generally, displaying pixel data is accomplished in part by loading memory cells connected to the pixel elements. Each memory cell receives one bit of data representing an on or off state of a pixel element. The image processing unit 12 is configured to maintain the pixel elements in their on or off states for a controlled duration to from a pixel array in a surface of the optical modulator.

The present invention can be applicable to other optical modulators within optical modulator assembly 18, including one or more optical modulators that are rapidly switchable between on and off states to define images on a viewing surface 22. Examples of other spatial light modulator technologies include DLD or interferometric modulator, liquid crystal on silicon (LCOS), liquid crystal display (LCD), linear arrays or deflectable beams and the like.

Viewing surface 22 has an aspect ratio defined as the ratio of surface width to surface height. In many applications, viewing surface 22 has an aspect ratio of 4 by 3 (4:3) or 16 by 9 (16:9). In many cases, the optical modulators of optical modulator assembly 18, and even homogenizing device 16, have a similar aspect ratio, or width to height, as the viewing surface. As such, that the image can be sent directly from optical modulator assembly 18 to viewing surface 22, via projection lens assembly 20, without any modification of the aspect ratio.

Illumination from light source assembly 14 is channeled to optical modulator assembly 18 via homogenizing device 16. In this light-channeling process, however, some illumination generated by light source assembly 14 does not reach optical modulator assembly 18, leading to some loss of efficiency of image display system 10. One reason some illumination is lost is due to the relative geometric configurations of light source assembly 14, homogenizing device 16, and optical modulator assembly 18. For example, where there is a geometric shape mismatch between the spatial distribution pattern of light source assembly 14 and the collection of light by the homogenizing device 16, there can be light loss.

Although in many applications optical modulator assembly 18 and homogenizing device 16 are configured to geometrically compliment viewing surface 22, the same is not typically the case for optical modulator assembly 18 and homogenizing device 16 with respect to light source assembly 14. In one embodiment, light source assembly 14 is configured to focus light onto the entry of homogenizing device 16. Typically, the light that falls on the entry to homogenizing device 16 is geometrically configured in a spatial distribution pattern that is arbitrary. Since homogenizing device 16 is configured to compliment viewing surface 22, with a rectangular aspect ratio of 4:3 or 16:9, some of the light can be lost in the change from an arbitrary shape configuration into a rectangular one. Loss will occur when light source assembly 14 essentially overfills homogenizing device 16.

For example, in some embodiments spatial distribution pattern from light source assembly that is focused onto homogenizing device 16 is geometrically configured in a circular patch. When homogenizing device 16 is configured to compliment viewing surface 22, that is, with a rectangular aspect, some of the light can be lost in the change from a circular configuration to a rectangular one.

Figure 2:
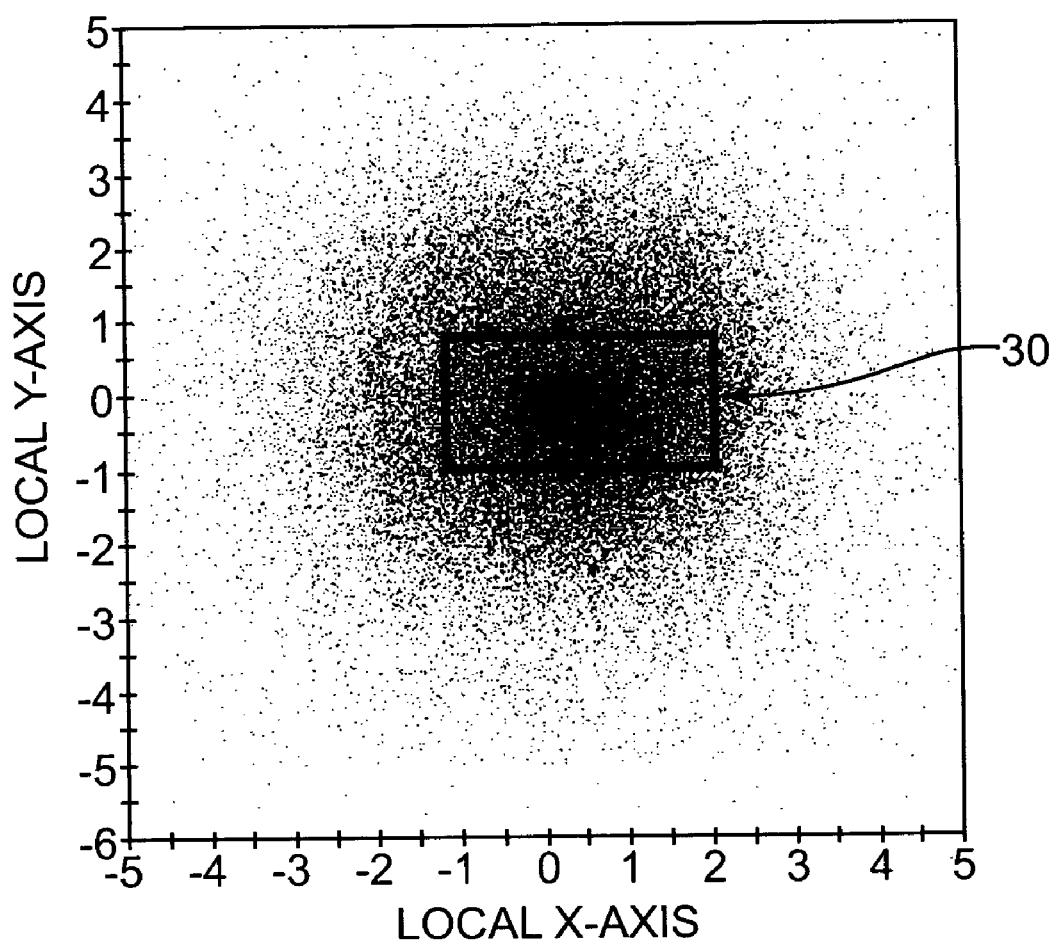
FIG. 2 illustrates a light distribution pattern relative to the focus of a light source for an aperture for an integrating tunnel.

FIG. 2 illustrates a spatial distribution pattern of light source assembly 14. In the illustrated example, the distribution pattern is generally circular. The dots illustrate light from light source assembly 14, and the more concentrated areas of dots illustrate more light. An aperture 30 of a homogenizing device 16 is illustrated over the light distribution. FIG. 2 illustrates a typical case where the light source is shown to be overfilling the homogenizing device. As is evident from the distribution, much of the light in the distribution is within aperture 30, and thus, is coupled into homogenizing device 16 for directing onto the surface of one or more optical modulators within optical modulator assembly 18. Because the light distribution in the illustration is substantially circular, however, the substantially rectangular-shaped aperture 30 does not couple all of the light from the spatial distribution pattern.

As such, in one embodiment of the present invention the aperture of homogenizing device 16 is configured to have an aspect ratio closer to 1:1 in order to couple additional light from light source assembly 14 into homogenizing device 16. In one embodiment, the aperture of homogenizing device 16 is configured to be square-shaped. In one embodiment, aperture 40 of homogenizing device 16 is substantially square-shaped and overlaid on the circular spatial distribution pattern of illumination from light source assembly 14.

Figure 3:
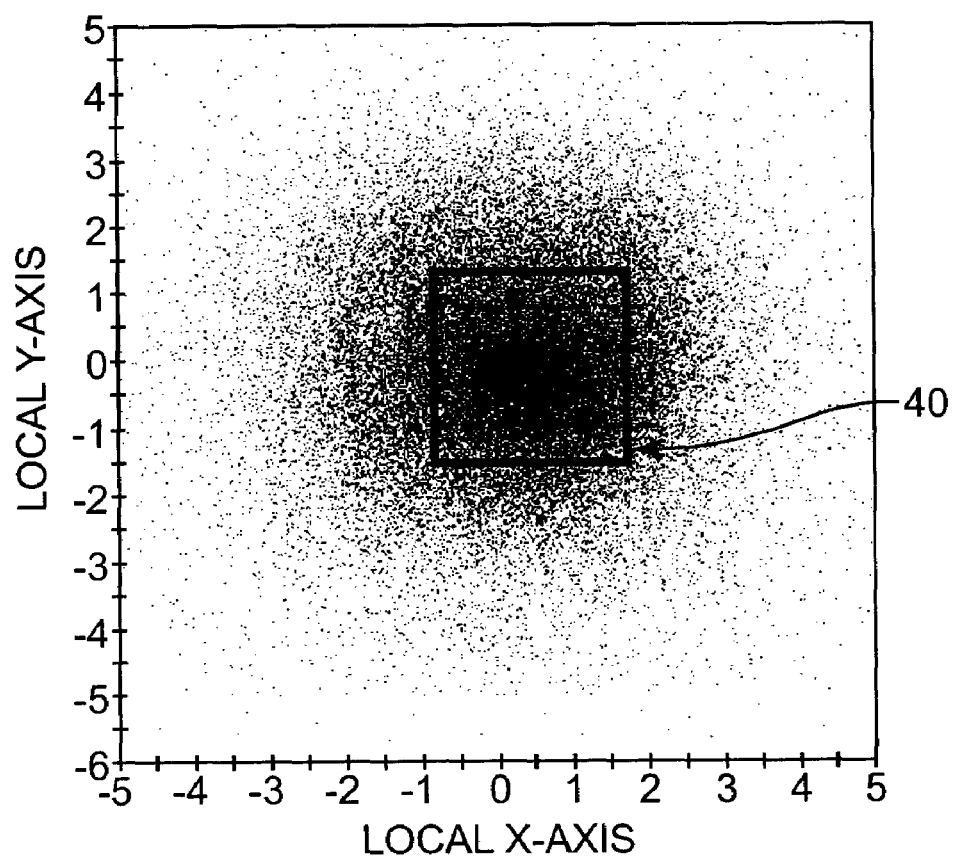
FIG. 3 illustrates a light distribution pattern relative to the focus of a light source for an aperture for an integrating tunnel in accordance with one embodiment of the present invention.

FIG. 3 illustrates a spatial distribution pattern of light source assembly 14, and the dots illustrate the light. Aperture 40 of homogenizing device 16 in accordance with one embodiment of the present invention is illustrated over the light distribution and has an aspect ratio substantially close to 1:1. In one case, aperture 40 is square-shaped. Aperture 40 is overlaid on the circular pattern of illumination. For comparison, rectangular-shaped aperture 30 is also illustrated in dotted lines in FIG. 3. As evident, substantially more light is captured by aperture 40 than is by rectangular-shaped aperture 30. In one embodiment, up to 35% more light is captured by a square-shaped aperture 40 than by rectangular-shaped aperture 30. As such, system 10 can achieve increased lumens or can use light source assembly 14 at a lower power level thereby conserving power.

In one embodiment, in order to use all the light coupled by the homogenizing device 16 having an aperture 40 with a substantially 1:1 aspect ratio, the surface of one or more optical modulators within optical modulator assembly 18 is also configured to have a substantially 1:1 aspect ratio as well. In one embodiment, one or more of the surfaces is configured to be square shaped. For a given light source, the light loss is greater when the aspect ratio of the modulator surface is higher such that there is greater overfilling. For example a 16:9 aspect ratio modulator will receive less light that a 4:3 aspect ratio modulator.

In one embodiment, both homogenizing device 16 and the surfaces of the optical modulators of optical modulator assembly 18 are configured to be substantially square-shaped in order to couple an increased amount illumination from light source assembly 14. In another embodiment, homogenizing device 16 is configured to be circular shaped to maximize the amount of illumination coupled into it from light source assembly 14, while the optical modulator surfaces of optical modulator assembly 18 are configured to be substantially square-shaped.

In any case, however, it is still desired in many applications to have viewing surface 22 maintain a substantially rectangular aspect ratio of 4:3 or 16:9. For example, where a substantially square-shaped homogenizing device 16 and a substantially square-shaped optical modulator assembly 18 are used, the image data processed by image processing unit 12 essentially has a 1:1 aspect ratio. When such image data is displayed on viewing surface 22 by an anamorphic magnification projection lens that is included in projection lens assembly 20 and is configured to a 4:3 aspect ratio, the image data is stretched in the width direction. Anamorphic projection lenses are quite well-known in the projection industry. Such lenses have different magnification in two orthogonal directions. As a result of stretching the image data, the image appears distorted and has different resolution along the width and the height.

To reduce the difference in resolution of the displayed image along the width and the height, in one embodiment, an image shifter 19 is also included and positioned in the optical path between the optical modulator assembly 18 and the viewing surface 22. In order to prevent the displayed image from being distorted by the anamorphic lens, the image data processed by image processing unit 12 is shifted by the image shifter 19 in coordinated fashion with the modification factor of the anamorphic lens. In addition, in one embodiment the image shifter 19 increases the resolution of the image data along the width relative to the height.

As such, image processing unit 12 generates multiple sub-frames of image data so that the image shifter 19 can shift display of image sub-frames of the image data before projection by projection lens assembly 20. The image shifter 19 is used to create two subframes side-by-side along the width, separated in one example, by approximately half of a pixel. Since the two subframes are projected at a frequency higher than the frequency that human eye can notice, the two sub-frames appear to exist simultaneously. The two sub-frames have substantially complementary data. As a result, the resolution appears to be increased along the width. Embodiments of an image shifter are described, for example, in related U.S. patent application Ser. No. 10/242,545, filed Sep. 11, 2002, Publication No. US 2004/0027313, now U.S. Pat. No. 6,963,319, assigned to the assignee of the present invention and incorporated herein by reference.

This technique of projecting sub-frames in rapid succession to appear as if they are being projected simultaneously and superimposed has also been referred to as wobulation or using a "wobbling device". The resulting image has significantly higher resolution than images produced by conventional digital projection devices. Additional embodiments of wobulation and wobbling devices are also described, for example, in related U.S. patent application Ser. No. 10/686,110, filed Oct. 14, 2003, Publication No. U.S. 2005/0078056, assigned to the assignee of the present invention and incorporated herein by reference.

In order to prevent the image distortion by the anamorphic projection, the image data on the optical modulator can be pre-distorted such that the anamorphic magnification by the projection lens cancels the distortion in the image. Additional embodiments of image display systems configured to optically scale pixels forming a displayed image by a ratio of the aspect ratio of image data for an image and the aspect ratio of a display device are described, for example, in related U.S. patent application Ser. No. 10/386,084, filed Sep. 16, 2004, Publication No. U.S. 2004/0179030, now U.S. Pat. No. 7,098,936, assigned to the assignee of the present invention and incorporated herein by reference. These additional embodiments provide additional exemplary details of using an anamorphic lens to change the aspect ratio of image data, as well as pre-distorting the image data, in order to display image data having an aspect ratio that differs from the aspect ration of the viewing surface 22.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system for displaying an image comprising:
an image processing unit configured to receive a video signal and generate image data and control signals;
a light source assembly controlled by the control signals to generate light;
a homogenizing device configured to homogenize light from the light source assembly;
a optical modulator assembly controlled by the control signals to generate images and configured to be illuminated from an illumination relay, which receives the homogenized light from the light source assembly, the optical modular assembly configured with at least one optical modulator surface;
a projection lens assembly configured to transfer the images from the optical modulator assembly onto a viewing surface;
wherein the optical modulator surface is configured to have a substantially 1:1 aspect ratio to increase the amount of light coupled from the light source
an anamorphic lens that changes an aspect ratio of the image data caused by the 1:1 aspect ratio of the optical modulator to match an aspect ratio of the viewing surface; and
an image shifter configured to shift the image data to increase resolution of the image in a width dimension due to the changes caused by the 1:1 aspect ratio of the optical modulator.

2. The system of claim 1, wherein the optical modulator surface is configured to be substantially square-shaped.

3. The system of claim 1, wherein the homogenizing device is configured with a substantially square-shaped aperture to increase the amount of light coupled from the light source assembly.

4. The system of claim 3, wherein homogenizing device is one of the group comprising an integrating tunnel, a rod and a fly's eye condenser lens system.

5. The system of claim 1, wherein the light source assembly is further configured to generate light in a spatial distribution pattern that is substantially circular.

6. The system of claim 5, wherein the optical modulator surface is geometrically overlaid on the circular display pattern of the light source assembly.

7. The system of claim 1, wherein the image processing unit is configured to shift the image data in coordinated fashion with a modification factor of the anamorphic lens.

8. The system of claim 1, wherein the light source assembly includes at least one in a group comprising an arc lamp, a color wheel and light emitting diodes.

9. A method for displaying an image comprising:

generating image data and control signals from a received video signal;

controlling a light source assembly with the control signals so as to generate light in a spatial distribution pattern;

coupling light from the light source assembly using a homogenizing device and illumination relay;

controlling an optical modulator assembly, which is configured with at least one optical modulator surface, with the control signals such that light received from the light source assembly via the homogenizing device and illumination relay generate an image from the image data on the optical modulator surface;

projecting the image from the optical modulator surface onto a viewing surface; providing the optical modulator surface with a substantially 1:1 aspect ratio in order to increase the amount of illumination coupled from the light source assembly;

anamorphically changing an aspect ratio of the image data caused by the 1:1 aspect ratio of the modulator surface to match an aspect ratio of the viewing surface; and shifting the image data in coordinated fashion with the anamorphic changes from the projection lens assembly due to the changes caused by the 1:1 aspect ratio of the optical modulator surface.

10. The method of claim 9 further comprising providing a homogenizing device configured with a substantially 1:1 aspect ratio to increase the amount of light coupled from the light source assembly.

11. The method of claim 9 further comprising providing a circular display pattern of the light source assembly to be geometrically overlaid on the optical modulator surface.

12. An image display device comprising:

an image processing unit configured to receive a video signal and generate image data and control signals;

a light source assembly and an optical modulator assembly each controlled by the control signals such that the light source assembly generates illumination in a spatial distribution pattern that is coupled to optical modular assembly via a homogenizing device;

a projection lens assembly configured to project an image from the optical modulator assembly onto a viewing surface;

means configured within the optical modular assembly for maximizing the amount of illumination coupled from the light source assembly, wherein the means is configured with at least one optical modulator surface configured to have a substantially 1:1 aspect ratio; and an anamorphic lens that changes an aspect ratio of the image data caused by the 1:1 ratio of the optical modulator surface to match an aspect ratio of the viewing surface and wherein the image processing unit is configured to shift the image data in coordinated fashion with the changes to the aspect ratio of the image data caused by the anamorphic lens due to the changes caused by the 1:1 aspect ratio of the optical modulator surface.

13. The device of claim 12, wherein the means configured within the optical modular assembly includes at least one optical modulator surface configured to be substantially square shaped.

14. The device of claim 12, wherein the homogenizing device is further configured to be substantially square-shaped to increase the amount of illumination coupled from the light source assembly and wherein the optical modulator surface is geometrically overlaid on a circular display pattern of the light source assembly.

15. The device of claim 12, further comprising an image shifter configured to shift the image data to increase resolution of the image data in a width dimension.

* * * * *